(12) United States Patent
Zhu et al.

(10) Patent No.: US 6,504,968 B1
(45) Date of Patent: Jan. 7, 2003

(54) OPTICAL SWITCHES INCLUDING REFLECTORS HAVING ASSOCIATED ACTUATORS AND LATCHES LOCATED ADJACENT TO A SURFACE THEREOF AND METHODS OF OPERATING SAME

(75) Inventors: Terry D. Zhu, Cary, NC (US); John S. McKillop, Raleigh, NC (US); Mark D. Walters, Durham, NC (US)

(73) Assignee: JDS Uniphase Inc., San Jose, CA (US)

( * ) Notice: Subject to any disclaimer, the term of this patent is extended or adjusted under 35 U.S.C. 154(b) by 120 days.

(21) Appl. No.: 09/650,990

(22) Filed: Aug. 30, 2000

(51) Int. Cl.⁷ .............................. G02B 6/35; G02B 26/08
(52) U.S. Cl. ............................ 385/18; 385/16; 359/223
(58) Field of Search .............................. 385/17–18, 19, 385/16, 14; 359/19.6, 223, 224

(56) References Cited

U.S. PATENT DOCUMENTS

| | | | |
|---|---|---|---|
| 5,909,078 A | 6/1999 | Wood et al. | 310/307 |
| 5,966,221 A | * 10/1999 | Tellam et al. | 358/474 |
| 6,195,478 B1 | * 2/2001 | Fouquet et al. | 385/16 |
| 6,275,320 B1 | * 8/2001 | Dhuler et al. | 310/306 |
| 6,330,102 B1 | * 12/2001 | Daneman et al. | 359/290 |
| 6,330,380 B1 | * 12/2001 | Young et al. | 385/17 |

OTHER PUBLICATIONS

Application Entitled: *MEMs Magnetically Actuated Switch and Associated Switching Arrays*, Ser. No. 09/487,976, filed: Jan. 20, 2000.

Application Entitled: *Add–Drop Optical Switches Including Parallel Fixed and Moveable Reflectors and Methods of Operating Same*, Ser. No.: 09/543,539, filed: Apr. 5, 2000.

Application Entitled: *MicroElectro Mechanical Optical Cross–Connect Switches Including Mechanical Actuators and Methods of Operation*, Ser. No.: 09/542,170, filed: Apr. 5, 2000.

* cited by examiner

Primary Examiner—Hemang Sanghavi
Assistant Examiner—Omar Rojas
(74) Attorney, Agent, or Firm—Myers Bigel Sibley & Sajovec

(57) ABSTRACT

Embodiments of the present invention can provide a substrate and a moveable reflector, on the substrate, having first and second opposing surfaces, wherein the moveable reflector moves to first and second positions on the substrate. A latch is located on the substrate adjacent to the first surface of the moveable reflector opposite the second surface and coupled to the moveable reflector, wherein the latch holds the moveable reflector in the first and second positions. An actuator is located on the substrate adjacent to the first surface of the moveable reflector opposite the second surface and is coupled to the latch, wherein the actuator moves the moveable reflector to the first and second positions. Also disclosed are moveable reflectors having a first reflecting position along an input beam path that reflects optical radiation from the input beam path along a first reflected beam path and a second reflecting position along the input beam path spaced-apart from the first reflecting position that reflects optical radiation from the input beam path along a second reflected beam path parallel to the first reflected beam path. Related methods are also disclosed.

33 Claims, 13 Drawing Sheets

|  | ACTUATOR STATES | | | | OUTPUT STATES | | | |
|---|---|---|---|---|---|---|---|---|
|  | 1001 | 1002 | 1003 | 1004 | I1 | I2 | I3 | I4 |
| 1 | OFF | ON | ON | ON | O4 | O3 | O1 | O2 |
| 2 | OFF | ON | ON | OFF | O1 | O3 | O4 | O2 |
| 3 | OFF | ON | OFF | ON | O4 | O3 | O2 | O1 |
| 4 | OFF | ON | OFF | OFF | O1 | O3 | O2 | O4 |
| 5 | OFF | OFF | ON | ON | O4 | O1 | O3 | O2 |
| 6 | OFF | OFF | ON | OFF | O1 | O4 | O3 | O2 |
| 7 | OFF | OFF | OFF | ON | O4 | O2 | O3 | O1 |
| 8 | OFF | OFF | OFF | OFF | O1 | O2 | O3 | O4 |
| 9 | ON | ON | ON | ON | O3 | O4 | O1 | O2 |
| 10 | ON | ON | ON | OFF | O3 | O1 | O4 | O2 |
| 11 | ON | ON | OFF | ON | O3 | O4 | O2 | O1 |
| 12 | ON | ON | OFF | OFF | O3 | O1 | O2 | O4 |
| 13 | ON | OFF | ON | ON | O3 | O1 | O4 | O2 |
| 14 | ON | OFF | ON | OFF | O3 | O4 | O1 | O2 |
| 15 | ON | OFF | OFF | ON | O3 | O2 | O4 | O1 |
| 16 | ON | OFF | OFF | OFF | O3 | O2 | O1 | O4 |

*FIG. 11.*

OPTICAL SWITCHES INCLUDING REFLECTORS HAVING ASSOCIATED ACTUATORS AND LATCHES LOCATED ADJACENT TO A SURFACE THEREOF AND METHODS OF OPERATING SAME

FIELD OF THE INVENTION

The present invention relates to the field of microelectromechanical devices, and more particularly, to microelectromechanical optical switches.

BACKGROUND OF THE INVENTION

Microelectromechanical (MEMS) devices recently have been developed as alternatives for conventional electromechanical devices, such as relays, actuators, valves and sensors. MEMS devices are potentially low-cost devices, due to the use of simplified microelectronic fabrication techniques. New functionality also may be provided because MEMS devices can be physically much smaller than conventional electromechanical devices.

MEMS technology has been used to fabricate optical switches using MEMS reflectors, such as mirrors, to switch inputs thereto to selected switch outputs. Some MEMS reflectors in optical switches can be moved to provide the desired switch functions. For example, when a moveable MEMS reflector is moved to a reflecting position along a beam path, optical radiation that is conducted along the beam path can be reflected by the moveable MEMS reflector. When the moveable MEMS reflector is moved to a non-reflecting position outside the beam path, the moveable MEMS reflector may not reflect optical radiation from the beam path. Accordingly, moveable reflectors in optical switches can be positioned in respective reflecting or non-reflecting positions so that the optical switch can provide the desired switch functions.

A conventional moveable MEMS reflector can provide optical radiation from an input beam path to one of two output beam paths where the two output beam paths are orthogonal to one another. For example, in the reflecting position, a conventional MEMS reflector may be oriented along the input beam path at a 45 degree angle relative the input beam path so that optical radiation incident thereon is reflected in a direction that is orthogonal to the input beam path. In the non-reflecting position, the conventional moveable MEMS reflector may be positioned outside the input beam path so that optical radiation conducted along the input beam path is not reflected by the conventional moveable MEMS reflector but passes through rather than being reflected. Therefore, optical radiation conducted along the input beam path continues in a direction that is parallel to the input beam path. Consequently, conventional moveable MEMS reflectors can switch optical radiation in different directions.

Conventional moveable MEMS reflectors can be moved between associated reflecting and non-reflecting positions by respective actuators coupled thereto. Unfortunately, the actuators and associated latches (actuator/latch combinations) may occupy so much of a substrate that it may be difficult to form more than one actuator/latch and an associated reflector on a common substrate. Accordingly, some MEMS optical switches are created by forming a wafer with multiple dies, wherein one moveable reflector/actuator/latch combination is formed on each die as shown in FIG. 1. The wafer is diced to provide separate dies each having a reflector/actuator/latch combination formed thereon.

A MEMS optical switch can be created by coupling together separate dies having separate reflector/actuator/latch combinations formed thereon. However, the distance between reflectors in such MEMS optical switches may be relatively large so that optical radiation propagating through the optical switch may be degraded. Furthermore, assembling multiple dies can be difficult which can increase manufacturing costs. For example, optical radiation from an output of a first moveable reflector on a first die can be provided to an input of a second moveable reflector on a second die using an optical fiber to couple the output to the input. Coupling the optical fiber to the first and second moveable reflectors can increase the manufacturing cost. Accordingly, there is a continuing need to provide improved moveable reflectors and optical switches.

SUMMARY OF THE INVENTION

Embodiments of the present invention can provide a substrate and a moveable reflector, on the substrate, having first and second opposing surfaces, wherein the moveable reflector moves to first and second positions on the substrate. A latch is located on the substrate adjacent to the first surface of the moveable reflector opposite the second surface and coupled to the moveable reflector, wherein the latch holds the moveable reflector in the first and second positions. An actuator also is located on the substrate adjacent to the first surface of the moveable reflector opposite the second surface and is coupled to the latch, wherein the actuator moves the moveable reflector to the first and second positions.

According to embodiments of the invention, more than one moveable reflector/actuator/latch combination can be located on a common die. The moveable reflectors can be placed in close proximity to one another so that the optical beam path distance between the moveable reflectors can be reduced, thereby reducing attenuation of optical radiation along the optical beam path. Furthermore, optical radiation may propagate between moveable reflectors in free-space, thereby reducing the need for optical fibers to couple the optical radiation between reflectors on separate dies. In contrast, conventional first and second moveable reflectors/actuator/latches may be located on separate substrates so that optical radiation reflected by the first reflector propagates across the a first die to the second moveable reflector on a second die via an optical fiber.

In some embodiments, the first and second positions are first and second respective parallel reflecting positions. In other embodiments, the first position is a reflecting position and the second position is a non-reflecting position.

In other embodiments, the substrate is a die of a wafer and the optical switch includes a second moveable reflector that is located on the die adjacent to the second opposing surface of the first moveable reflector. The second moveable reflector has first and second opposing surfaces, wherein the second moveable reflector moves to first and second positions on the die. A second latch is located on the die adjacent to the first surface of the second moveable reflector opposite the second surface and coupled to the second moveable reflector, wherein the second latch holds the second moveable reflector in the first and second positions. A second actuator is located on the die adjacent to the first surface of the second moveable reflector opposite the second surface and is coupled to the second latch, wherein the second actuator moves the second moveable reflector to the first and second positions associated therewith.

In other embodiments of the present invention, moveable reflectors have a first reflecting position along an input beam path that reflects optical radiation from the input beam path along a first reflected beam path and a second reflecting position along the input beam path spaced-apart from the first reflecting position that reflects optical radiation from the input beam path along a second reflected beam path parallel to the first reflected beam path.

In some embodiments, a moveable reflector moves from the first reflecting position to the second reflecting position in a direction that is substantially orthogonal to a reflective surface of the moveable reflector. In other embodiments, the moveable reflector moves from the first reflecting position to the second reflecting position in a direction that is substantially parallel to the first and second reflected beam paths.

In other embodiments, a second moveable reflector has first and second associated reflecting positions along the first and second reflected beam paths, wherein the second moveable reflector reflects optical radiation from the first reflected beam path to a third reflected beam path and reflects optical radiation from the second reflected beam path to a fourth reflected beam path when the second moveable reflector is in the first reflecting position associated with the second moveable reflector. The second moveable reflector reflects optical radiation from the first reflected beam path to a fifth reflected beam path and reflects optical radiation from the second reflected beam path to a sixth reflected beam path when the second moveable reflector is in the second reflecting position associated with the second moveable reflector.

In other embodiments, the first and second moveable reflectors each move equal distances in substantially parallel directions between the respective first and second reflecting positions where the fourth and fifth reflected beam paths are co-incident. In other embodiments, the first and second moveable reflectors move unequal distances in parallel directions between the respective first and second reflecting positions where the fourth and fifth reflected beam paths are spaced-apart. In further embodiments, the first moveable reflector moves a distance in a first direction that is substantially parallel to a reflective surface of the first moveable reflector and the second moveable reflector moves the distance in a second direction that is substantially parallel to the first and second reflected beam paths where the fourth and fifth reflected beam paths are spaced-apart.

In other embodiments, an optical switch according to the present invention can include first and second moveable reflectors each having associated first and second reflecting positions, wherein optical radiation from a first one of a plurality of inputs is reflected from the first and second moveable reflectors to a first one of a plurality of outputs and optical radiation from a second one of the of the plurality of inputs is reflected from the first and second moveable reflectors to a second one of the plurality of outputs.

In related methods according to the present invention, a first moveable reflector can be moved to one of a first and second associated reflecting positions along an input beam path to reflect optical radiation from the input beam path to one of a first and second reflected beam paths. A second moveable reflector can be moved to one of a first and second associated reflecting positions along the first and second reflected beam paths to reflect optical radiation from one of the first and second reflected beam paths to an output.

BRIEF DESCRIPTION OF THE DRAWINGS

FIG. 11 is a table that illustrates reflector positions and corresponding switch functions for operations of embodiments of partially blocking 4×4 optical switches according to the present invention.

DETAILED DESCRIPTION OF THE INVENTION

Figure 1:
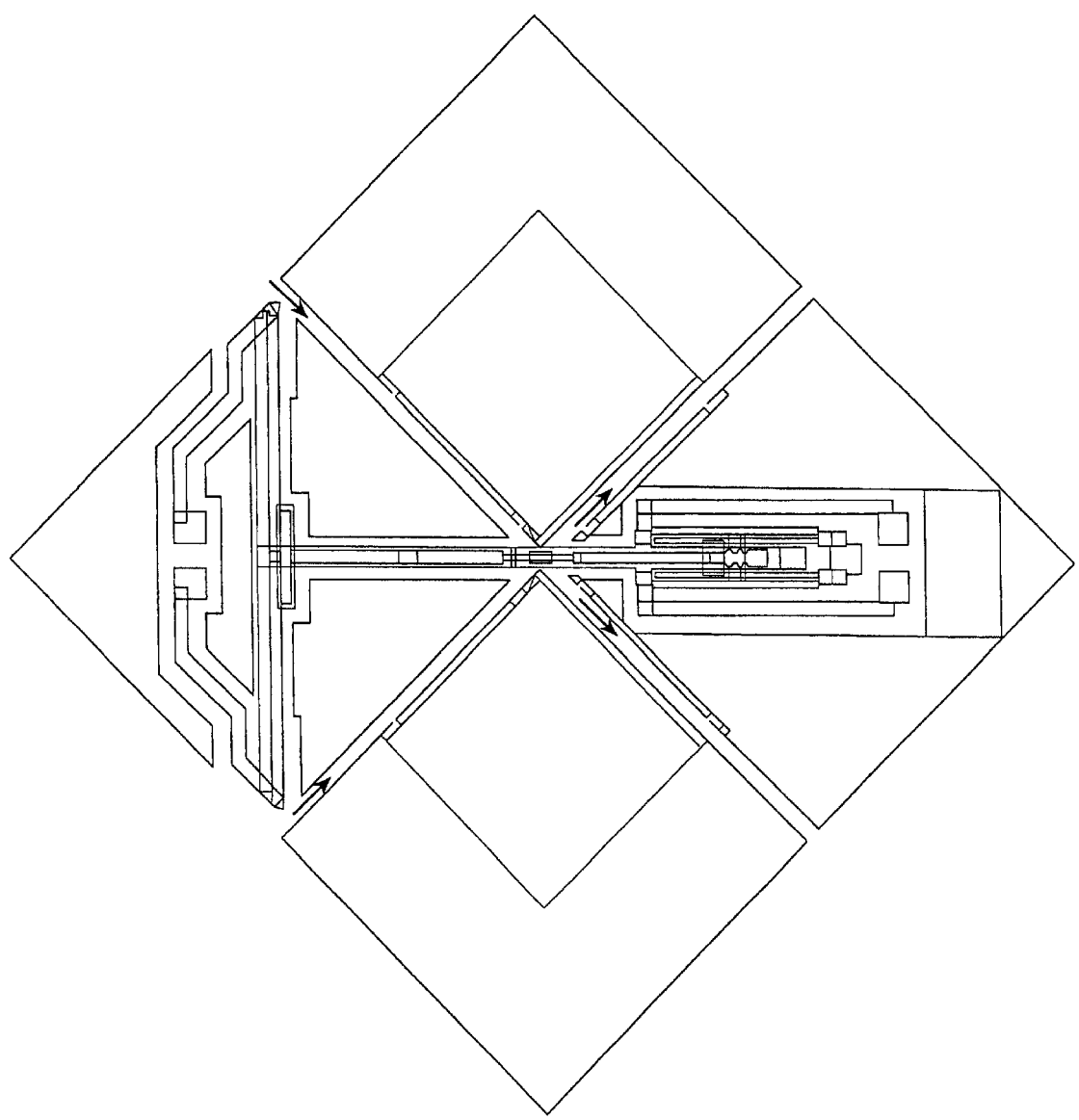
FIG. 1 is a plan view of a conventional moveable reflector and an associated actuator and latch on a common die.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the size of regions and elements therein may be exaggerated for clarity. Like numbers refer to like elements throughout.

It will be understood that when an element such as a layer, region, substrate or reflector is referred to as being "on" another element, it can be directly on the other element or intervening elements may also be present. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the term "optical radiation" can include radiation that can be used to transmit data in a communications system, such as radiation in the visible, ultraviolet, infrared and/or other portions of the electromagnetic radiation spectrum. Although the present invention is described herein by reference to MEMS actuators, it will be understood that the present invention may be utilized with other actuators. As used herein, the term optical "switch" can include optical devices that function as multiplexers, demultiplexers, and switches.

Figure 2:
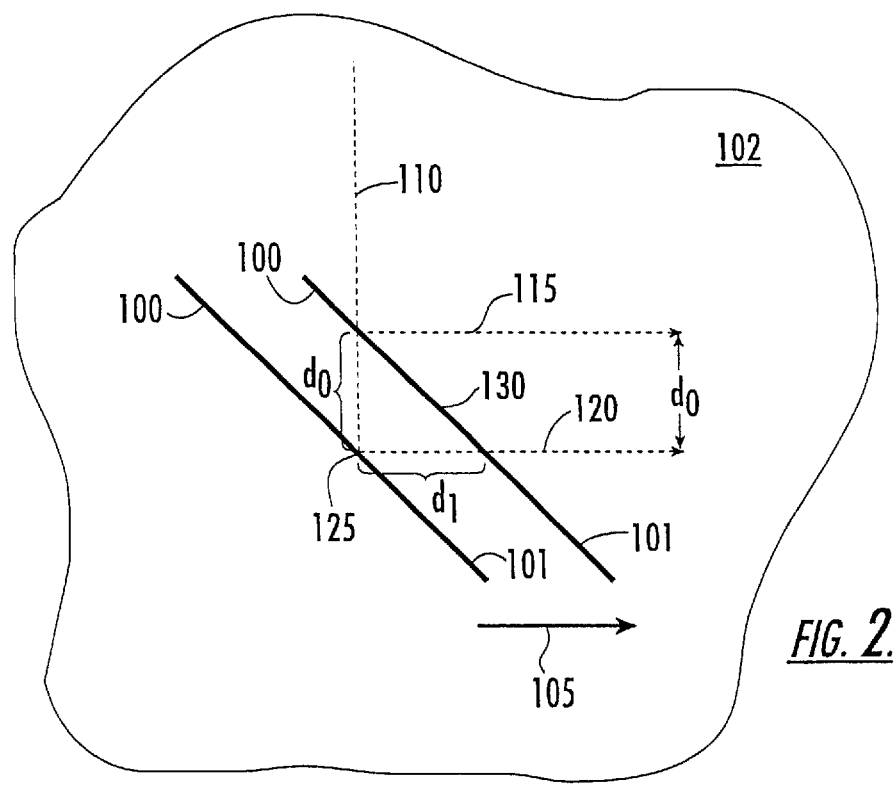
FIG. 2 is a plan view that illustrates embodiments of moveable reflectors having at least two reflecting positions according to the present invention.

FIG. 2 is a plan view that illustrates embodiments of moveable reflectors having first and second reflecting positions according to the present invention. In particular, a moveable reflector 100 can be positioned on a substrate 102 in first and second reflecting positions 125, 130 along an input beam path 110. The moveable reflector 100 reflects optical radiation from the input beam path 110 when in the first and second reflecting positions 125, 130. Therefore, moveable reflectors 100 according to the present invention can reflect optical radiation from the input beam path in a direction that is orthogonal to the input beam path 110.

It may be difficult to fabricate reflectors having orientations orthogonal to one another using monocrystalline silicon. Accordingly, moveable reflectors 100 according to the present invention can be oriented to define a 45 degree angle between the input beam path 110 and a reflective surface 101 of the moveable reflector 100. It will be understood that moveable reflectors 100 according to the present invention can be oriented to define other angles. For example, the moveable reflector 100 can be oriented to define about a 70 degree angle between the input beam path 110 and the reflective surface 101. Moveable reflectors 100 according to the present invention can be formed using wet etching or other techniques known to those having skill in the art. The fabrication of moveable reflectors is further described, for example, in commonly assigned U.S. patent application Ser. No. 09/542,672, Apr. 4, 2000 and entitled Add-Drop Optical Switches Including Parallel Fixed and Moveable Reflectors and Methods of Operating Same, the entirety of which is incorporated herein by reference.

As used herein, the term "reflecting position" includes positions where the reflective surface 101 intersects the input beam path 110 so that the optical radiation conducted along the input beam path 110 is reflected by the moveable reflector 100. Accordingly, moveable reflectors 100 according to the present invention can reflect optical radiation from the input beam path 110 in more than one position. The term "non-reflecting" position includes positions where the reflective surface 101 does not intersect the input beam path so that optical radiation conducted along the input beam path 110 is not reflected by the moveable reflector.

As shown in FIG. 2, the moveable reflector 100 can move from the first reflecting position 125 to the second reflecting position 130 in a direction 105 that is substantially orthogonal to the input beam path 110. When the moveable reflector 100 is in the first reflecting position 125, optical radiation is reflected from the input beam path 110 to a first reflected beam path 120 in the direction 105. When the moveable reflector 100 is in the second reflecting position 130, optical radiation is reflected from the input beam path 110 to a second reflected beam path 115 in the direction 105.

The first and second reflecting positions 125, 130 can be parallel and separated by a distance, d1 along the direction 105. In embodiments where the moveable reflector 100 is oriented to define a 45 degree angle between the input beam path 110 and the reflective surface 101, the first and second reflected beam paths 120, 115 can be separated by a distance d0 which is equal to the distance d1. In some embodiments, the distance d1 is in a range between about 50 um and about 60 um. In other embodiments, the distance d1 is about 100 um. Other directions may be used.

Moveable reflectors 100 according to the present invention can be moved to the associated reflecting positions by actuators such as those disclosed in U.S. Pat. No. 5,909,078 to Wood et al. (Wood) entitled Thermal Arched Beam Microelectromechanical Actuators, the entire disclosure of which is incorporated herein by reference. Wood discloses a family of thermal arched beam microelectromechanical actuators that include an arched beam which extends between spaced-apart supports on a microelectronic substrate. The arched beam expands upon application of heat thereto. For example, as described in Wood, a current is passed through the arched beams to cause thermal expansion thereof. Alternatively, as described in Wood, the thermal arched beams are heated by an external heater across an air gap.

Moveable reflectors 100 according to the present invention can be moved magnetically. For example, moveable reflectors 100 may be moved between the first and second reflecting positions by applying a magnetic field to the moveable reflector 100. Magnetically actuated reflectors are described further, for example, in U.S. patent application Ser. No. 09/487,976 entitled MEMs Magnetically Actuated Switch and Associated Switching Arrays, the entire disclosure of which is incorporated herein by reference.

The actuators can be mechanical actuators such as those described in U.S. patent application Ser. No. 09/542,170, entitled MicroElectroMechanical Optical Cross-Connect Switches Including Mechanical Actuators and Methods Of Operation Same, the entire disclosure of which is incorporated herein by reference. Other types of actuators can be used.

It will be understood that moveable reflectors 100 according to the present invention can have more than two reflecting positions. For example, in some embodiments, the moveable reflector 100 can be moved to a third reflecting position parallel to the first and second reflecting positions 125, 130 that is separated from the first reflecting position 125 by a distance 2×d0. In other embodiments, the third reflecting position is located between the first and second reflecting positions 125, 130.

Figure 3:
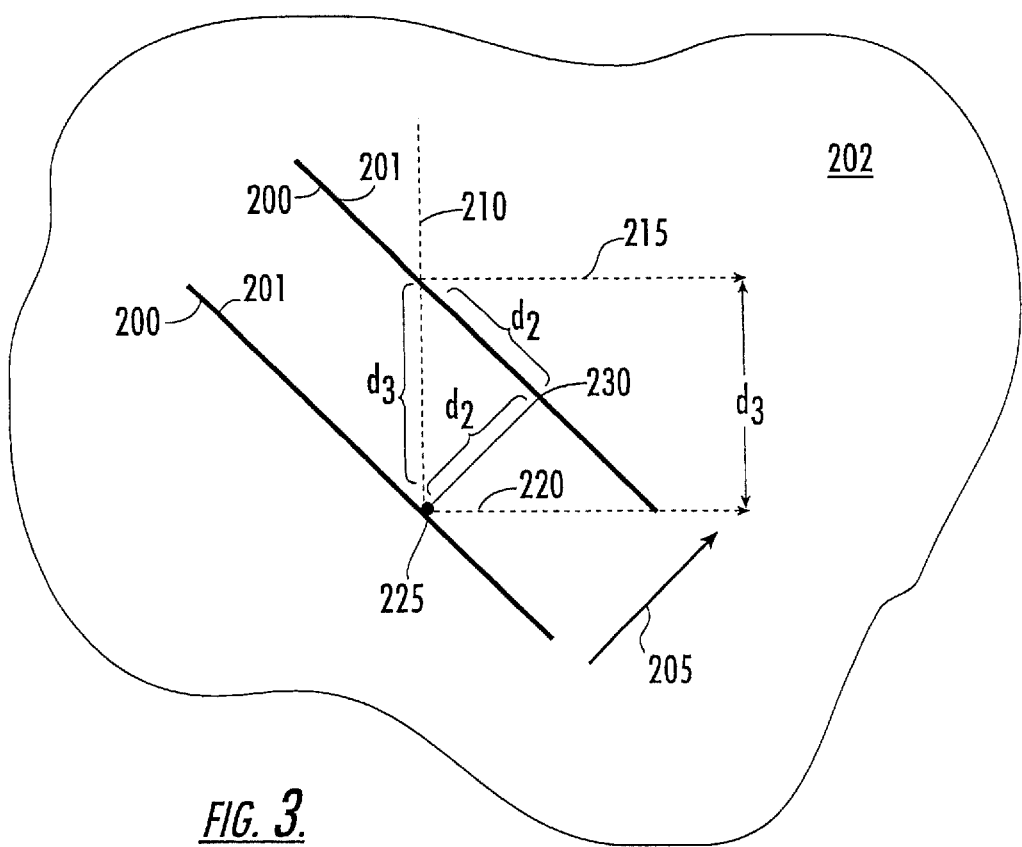
FIG. 3 is a plan view that illustrates embodiments of moveable reflectors having at least two reflecting positions according to the present invention.

FIG. 3 is a plan view that illustrates embodiments of moveable reflectors 200 having first and second reflecting positions 225, 230 according to the present invention. The moveable reflector 200 reflects optical radiation conducted along input beam path 210 from a reflective surface 201 on the moveable reflector 200. When the moveable reflector 200 is in the first reflecting position 225, optical radiation is reflected from the input beam path 210 to a first reflected beam path 220. When the moveable reflector 200 is in the second reflecting position 230, optical radiation is reflected from the input beam path 210 to the second reflected beam path 215.

The moveable reflector 200 moves from the first reflecting position 225 to the second reflecting position 230 in a direction 205 which is substantially orthogonal to the reflective surface 201. The moveable reflector 200 moves a distance, d2, in the direction 205 from the first reflecting position 225 to the second reflecting position 230. The separation, d3, between the first and second reflected beam paths 220, 215 is related to d2 according to the following equations:

$$d_2^2 + d_2^2 = d_3^2 \tag{1}$$

$$2d_2^2 = d_3^2 \tag{2}$$

$$\sqrt{2d_2^2} = d_3 \tag{3}$$

$$d_2\sqrt{2} = d_3 \tag{4}$$

$$1.4 \times d_2 = d_3 \tag{5}$$

According to equations 1–5, the distance d3 between the first and second reflected beam paths 220, 215 is 1.4 times the distance d2 moved by the moveable reflector 200 from the first to the second reflecting positions 225, 230. Therefore, when the moveable reflector 200 moves 100 um from the first to the second reflecting position 225,230, the separation between the first and second reflected beam paths can be about 140 um.

Some optical fibers may have a diameter of about 125 um. Accordingly, optical switches may provide outputs that are spaced-apart by about 140 um to allow such optical fibers to be coupled to the optical switches. According to the present invention, a movement of about 100 um between reflecting positions can provide reflected beam paths that are spaced-apart by about 140 um according to equations (1)–(5), thereby allowing conventional optical fibers to be coupled thereto.

It will be understood that moveable reflectors according to the present invention can have a reflecting position and a non-reflecting position. For example in some embodiments according to FIG. 3, the position 230 can be a reflecting position that is along an input beam path and the position 225 can be a non-reflecting position that is outside the input beam path. Accordingly, the moveable reflector 200 moves from the reflecting position 230 to the non-reflecting position 225 in a direction that is orthogonal to the reflective surface 201 a distance that moves the reflector 200 outside the input beam path.

Figure 4:
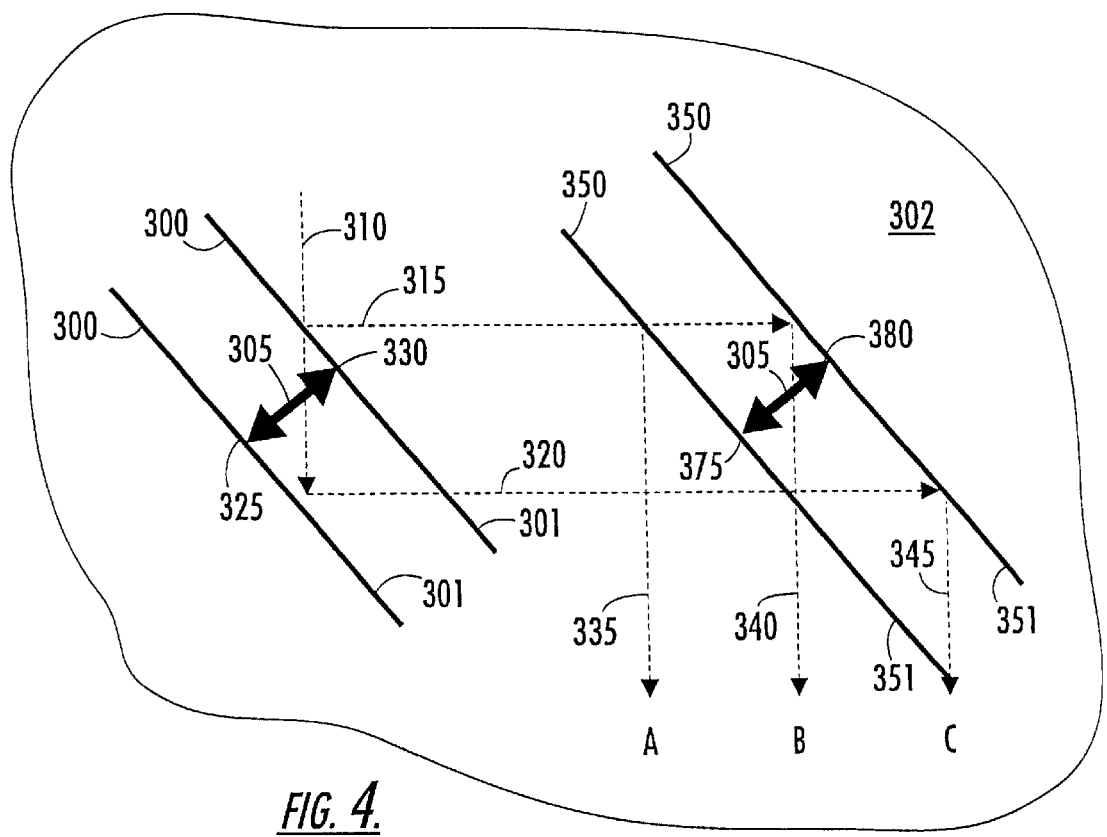
FIG. 4 is a plan view that illustrates embodiments of 1×3 optical switches according to the present invention.

FIG. 4 is a plan view that illustrates embodiments of 1×3 MEMS optical switches according to the present invention. According to FIG. 4, two moveable reflectors 300, 350 according to the present invention can be combined to provide the functionality of a 1×3 optical switch.

A first moveable reflector 300 can be positioned in a first reflecting position 325 and a second reflecting position 330. When the first moveable reflector 300 is in the first reflecting position 325, the first moveable reflector 300 reflects optical radiation from an input beam path 310 to a first reflected beam path 320 that is orthogonal to the input beam path 310. When the first moveable reflector 300 is in the second reflecting position 330, optical radiation is reflected from the input beam path 310 to a second reflected beam path 315 that is orthogonal to the input beam path 310.

The first moveable reflector 300 moves a separation distance 305 in a direction that is orthogonal to the reflective surface 301 of the first moveable reflector 300. As described above, moving the first moveable reflector 300 the separation distance 305 in a direction which is orthogonal to the reflective surface 301, provides a separation between the first and second reflected beam paths 320, 315 which can be 1.4 times greater than the separation distance 305.

A second moveable reflector 350 can be oriented parallel to the first moveable reflector and positioned in first or second associated reflecting positions 375, 380. The second moveable reflector 350 moves the separation distance 305 in a direction that is orthogonal to a reflective surface 351 on the second moveable reflector 350. When the second moveable reflector 350 is in the first reflecting position 375, optical radiation is reflected from the first or second reflected beam path 320, 315 to outputs B or A along fourth or third reflected beam paths 340, 335 respectively. The fourth and third reflective beam paths 340, 335 are orthogonal to the second and first reflected beam paths 315, 320.

When the second moveable reflector 350 is in the second reflecting position 380, optical radiation is reflected from the first or second reflected beam path 320, 315 to outputs C or B along a fifth reflected beam path 345 or the fourth reflected beam path 340 respectively. The first and second reflected beam paths 320, 315 are orthogonal to the fifth and fourth reflected beam paths 345, 340. As discussed above, the first and second reflecting positions 375, 380 are separated by the separation distance 305 thereby providing a separation of about 1.4 times the separation distance between the third through fifth reflective beam paths 335, 340, 351.

It will be understood that if the first and second moveable reflectors each move an equal separation distance in the same direction, optical radiation can be reflected along coincident reflected beam paths. For example, as shown in FIG. 4, when the first moveable reflector 300 is in the second reflecting position 330 and the second moveable reflector 350 is in the second reflecting position 380 optical radiation is reflected along the fourth reflected beam path 340. Alternatively, when the first moveable reflector 300 is in the first reflecting position 325 and the second moveable reflector 350 is in the first reflecting position 375 optical radiation is also reflected along the fourth reflected beam path 340.

Figure 5A:
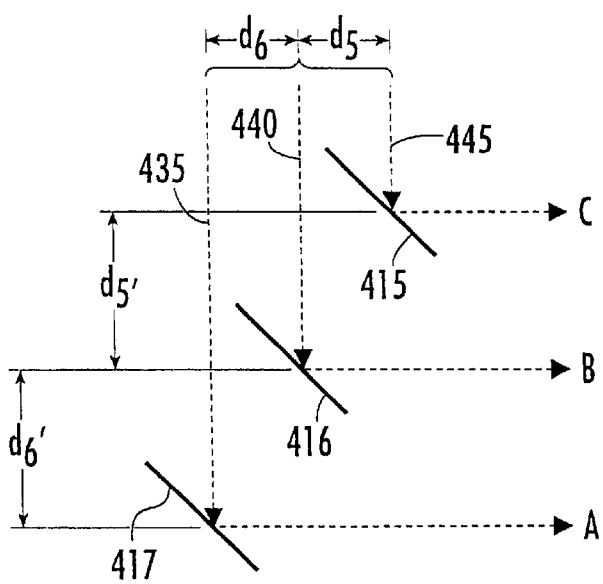
FIGS. 5A and 5B are plan views that illustrates embodiments of output stages of 1×3 optical switches according to the present invention.
Figure 5B:
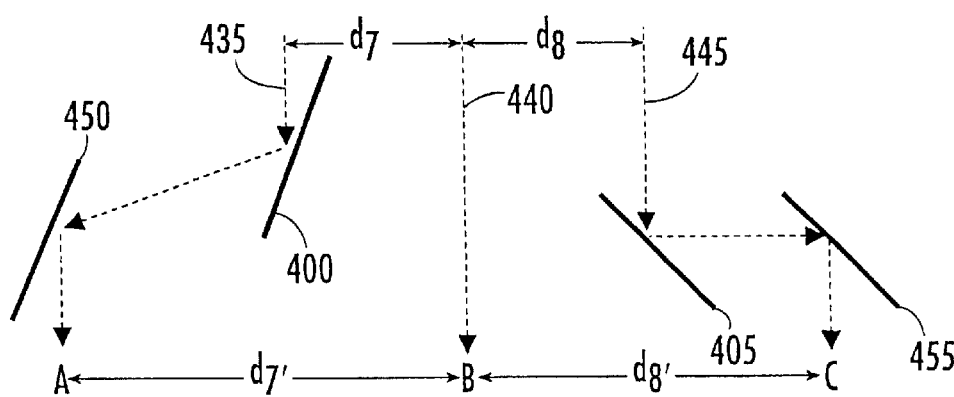

FIGS. 5A and 5B are plan views which illustrate fixed reflectors which can be positioned along the reflective beam paths to further increase the spacing between outputs of an optical switch according to the present invention. Embodiments illustrated in FIGS. 5A and 5B can be used, for example, in conjunction with any of the embodiments of optical switches described herein.

According to FIG. 5A, the spacing between outputs of a MEMS optical switch can be further increased by positioning fixed reflectors 415, 416, 417 parallel to first and second moveable reflectors 405, 455 and at 45 degree angles relative to respective reflective beam paths 435, 440, 445 having spacings of d5 and d6 therebetween. Accordingly, the spacing between outputs of the optical switch can be further increased to d5' and d6' respectively.

As shown in FIG. 5B, the spacing between outputs of the MEMS optical switch may be further increased using fixed reflectors oriented at different angles relative to the respective reflective beam paths having a spacing d7 and d8 therebetween. In particular, a fixed reflector 400 can be oriented at about a 70 degree angle relative to a reflective beam path 435 to reflect optical radiation from the reflected beam path 435 to a fixed reflector 450. The fixed reflector 450 is oriented parallel to the reflector 400. Optical radiation reflected from the fixed reflector 400 is reflected to output A by the fixed reflector 450. Optical radiation conducted along reflected beam path 440 is not reflected by a reflector, thereby providing a spacing d7' between outputs A and B.

A fixed reflector 405 is oriented at a 45 degree angle relative to a reflected beam path 445. The fixed reflector 405 reflects optical radiation from the reflected beam path 445 to a fixed reflector 455. The fixed reflector 455 reflects the optical radiation reflected by the fixed reflector 405 to an output C. Accordingly, the spacing between outputs B and C can be increased from d8 to d8'. The fixed reflectors can also be formed at other angles using, for example, a dry etching process such as RIE.

Embodiments, such as those shown in FIGS. 4A and 4B, can be used to provide spacing of 140 um between outputs where moveable reflectors provide reflected beam paths having a spacing of less than 100 um therebetween. For example, some actuators may move about 50 um to 60 um between first and second positions. If such actuators are used in conjunction with, for example, embodiments illustrated in FIG. 4, the spacing between outputs A and B and B and C may be about 70 um to 84 um. Therefore, embodiments such as those shown in FIGS. 5A and 5B may be used to further increase the spacing between outputs. Alternatively, the embodiments such as those shown in FIGS. 5A and 5B may utilize moveable reflectors.

Figure 6:
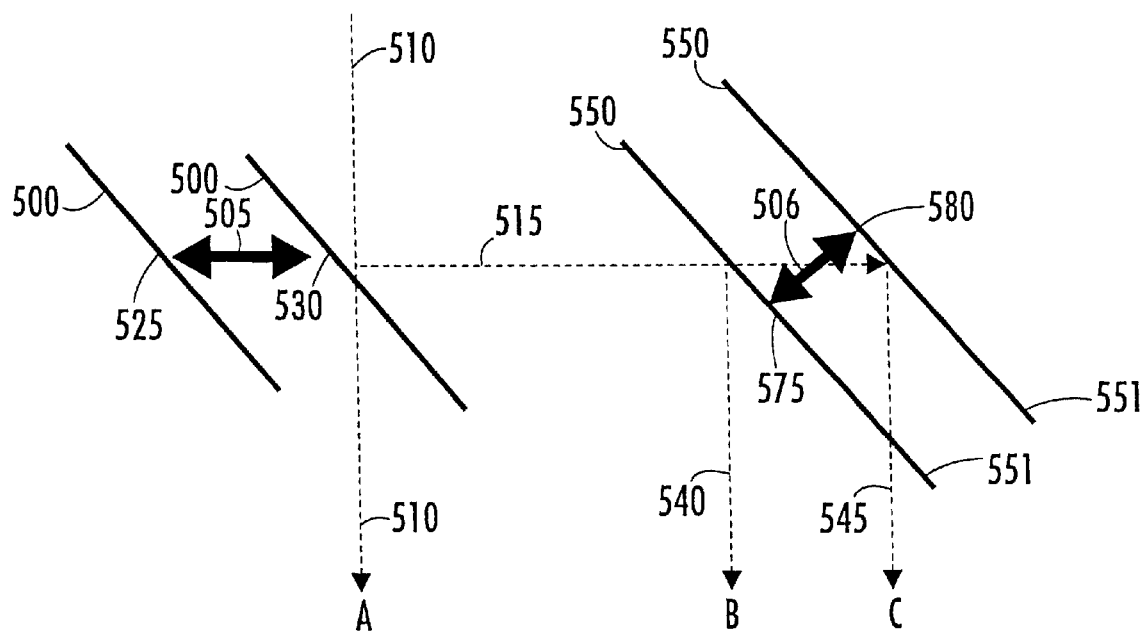
FIG. 6 is a plan view that illustrates embodiments of 1×3 optical switches according to the present invention.

FIG. 6 is a plan view that illustrates embodiments of 1×3 MEMS optical switches according to the present invention. A first moveable reflector 500 can be positioned in a reflecting position 530 and a nonreflecting position 525. When the first moveable reflector 500 is in the reflecting position 530, optical radiation is reflected from the input beam path 510 to a first reflected beam path 515 which is orthogonal to the input beam path 510. When the first moveable reflector 500 is in the nonreflecting position 525, optical radiation is not reflected from the input beam path 510 and is allowed to propagate to an output A of the 1×3 optical switch. The first moveable reflector 500 moves a first separation distance 505 from the reflecting position 530 to the nonreflecting position 525 in a direction which is orthogonal to the input beam path 510.

A second moveable reflector 550 can be positioned in a first reflecting position 575 or a second reflecting position 580. When the second moveable reflector 550 is in the first reflecting position 575, optical radiation is reflected from the first reflected beam path 515 to an output B along a second reflected beam path 540 that is orthogonal to the first reflected beam path 515. When the second moveable reflector 550 is in the second reflecting position 580, optical radiation is reflected from the first reflected beam path 515 to an output C long a third reflected beam path 545 which is orthogonal to the first reflected beam path 515. The second moveable reflector 550 moves a second separation distance 506 from the first reflecting position 575 to the second reflected position 580 in a direction which is orthogonal to a reflective surface 551 of the second moveable reflector 550.

Figure 7:
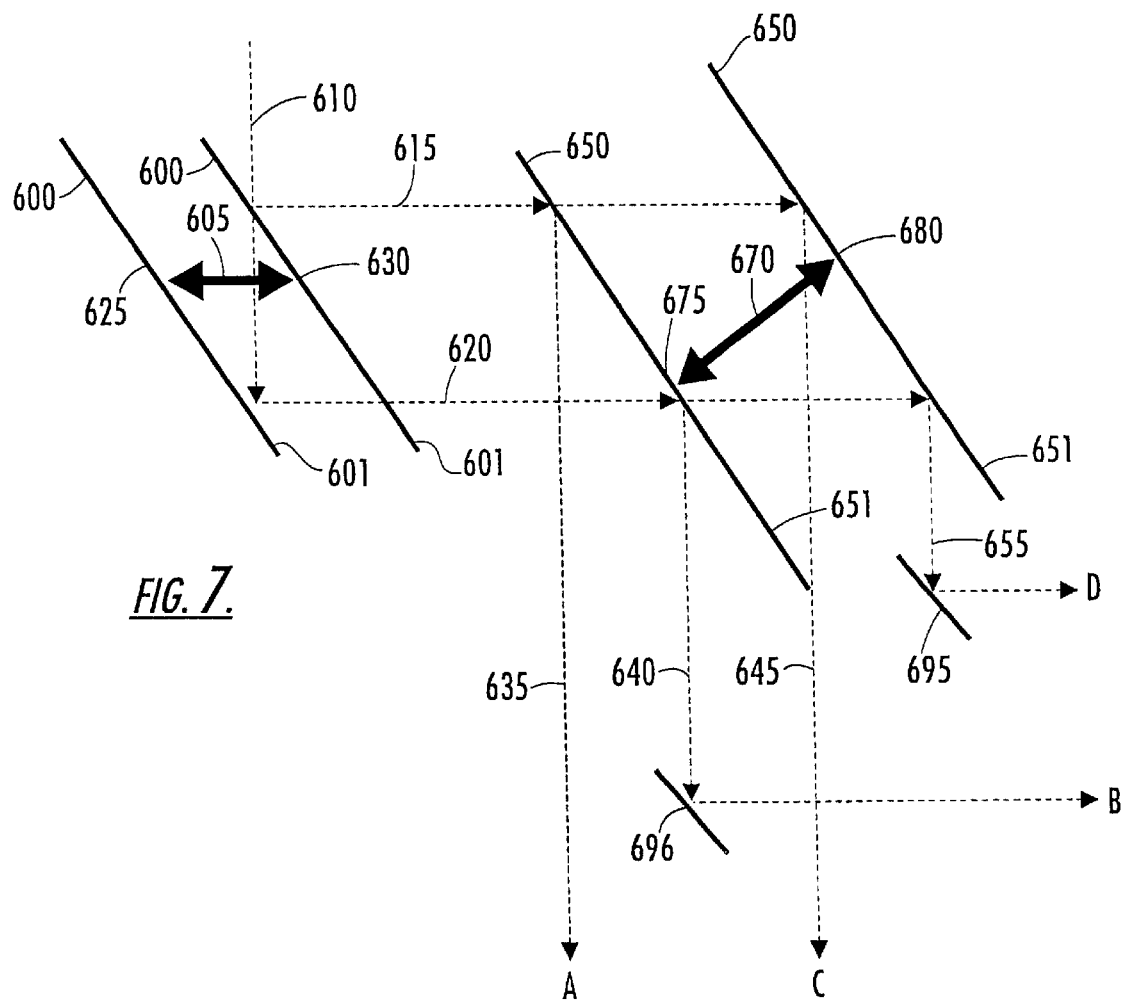
FIG. 7 is a plan view that illustrates embodiments of 1×4 optical switches according to the present invention.

FIG. 7 is a plan view that illustrates embodiments of 1×4 MEMS optical switches according to the present invention. A first moveable reflector 600 can be positioned in a first reflecting position 625 or a second reflecting position 630. When the first moveable reflector 600 is in the first reflecting position 625, the first moveable reflector 600 reflects optical radiation from an input beam path 610 to a first reflected beam path 620 that is orthogonal to the input beam path 610. When the first moveable reflector 600 is in the second reflecting position 630, optical radiation is reflected from the input beam path 610 to a second reflected beam path 615 that is orthogonal to the input beam path 610. The first moveable reflector 600 moves a first separation distance 605 between the first and second reflecting positions 625, 630 in a direction that is orthogonal to the input beam path 610.

A second moveable reflector 650 can be positioned in a first reflecting position 675 or a second reflecting position 680 separated by a second separation distance 670. As shown in FIG. 6, the second separation distance 670 may be greater than the first separation distance 605. When the second moveable reflector 650 is in the first reflecting position 675, optical radiation is reflected from the first reflected beam path 620 or the second reflected beam path 615 to a third reflected beam path 635 or a fourth reflected beam path 640 respectively. The third and fourth reflected beam paths 635, 640 are orthogonal to the first and second reflected beam paths 620, 615 and provide optical radiation to output A and output B (via reflector 696) respectively.

When the second moveable reflector 650 is in the second reflecting position 680, optical radiation is reflected from the first reflected beam path 620 or the second reflected beam path 615 to a sixth reflected beam path 655 or a fifth reflected beam path 645 respectively. The fifth and sixth reflected beam paths 655, 645 are orthogonal to the first and second reflected beam paths 620, 615 and provide optical radiation to output D (via reflector 695) and output C respectively. As shown in FIG. 7, the reflectors 696 and 695 can be used to further increase the spacing between outputs A–D.

It will be understood that when the first and second moveable reflectors 600, 650 move unequal separation distances or move in different directions, optical radiation can be reflected along separated reflected beam paths. For example, in contrast to the embodiments illustrated in FIG. 4, when the first moveable reflector 600 is in the second reflecting position 630 and the second moveable reflector 650 is in the second reflecting position 680 optical radiation is reflected along the fifth reflected beam path 645. Alternatively, when the first moveable reflector 600 is in the first reflecting position 625 and the second moveable reflector 650 is in the first reflecting position 675, optical radiation is reflected along the fourth reflected beam path 640 separated from the fifth reflected beam path 645.

Figure 8:
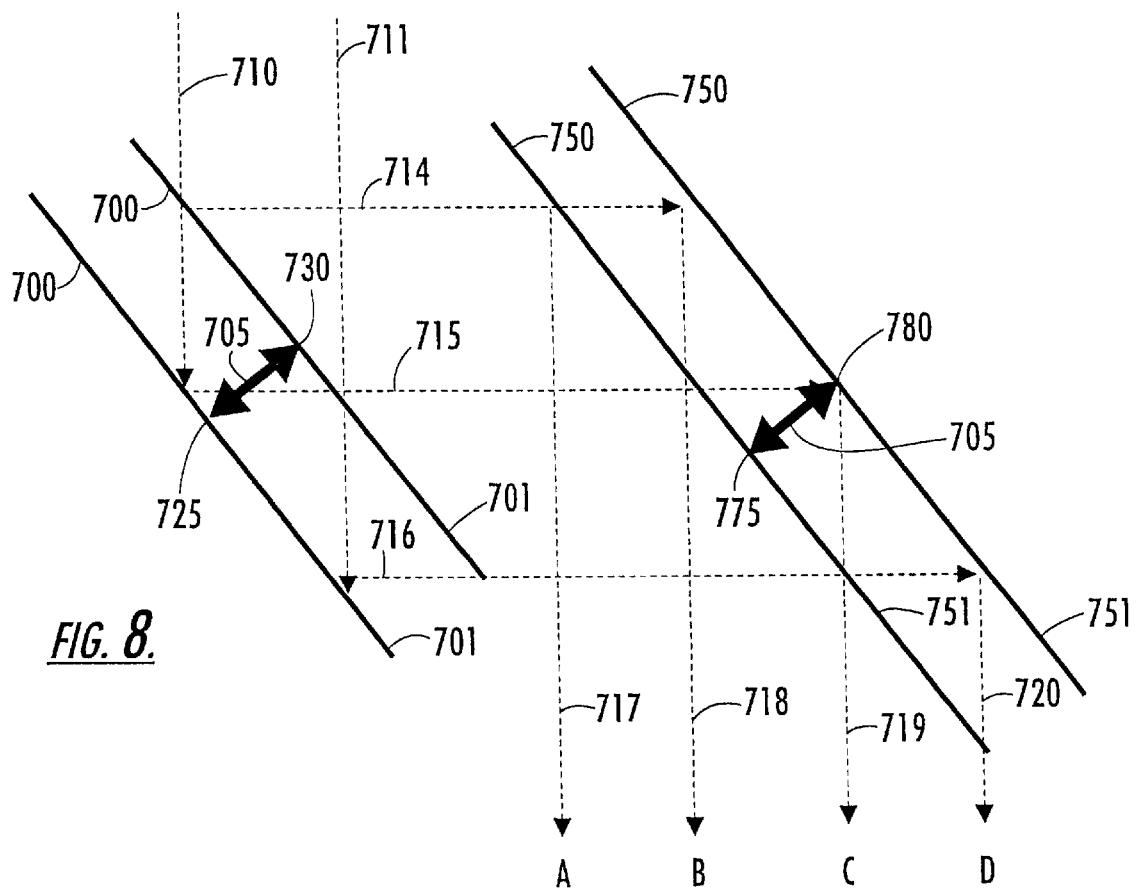
FIG. 8 is a plan view that illustrates embodiments of 2×4 optical switches according to the present invention.

FIG. 8 is a plan view that illustrates embodiments of 2×4 optical switches according to the present invention. According to FIG. 8, first and second moveable reflectors 700, 750 according to the present invention can be combined to provide the functionality of a 2×4 optical switch. It will be understood that other optical switch sizes may be provided. For example, 4×16 optical switches can be provided according to the present invention.

The first moveable reflector 700 can be positioned in a first reflecting position 725 or a second reflecting position 730. When the first moveable reflector 700 is in the first reflecting position 725, the first moveable reflector 700 reflects optical radiation from first and second input beam paths 710,711 to first and second reflected beam paths 715, 716 respectively that are orthogonal to the first and second input beam paths 710, 711. When the first moveable reflector 700 is in the second reflecting position 730, optical radiation is reflected from the first and second input beam paths 710,711 to a third and the first reflected beam paths 714,715 that are orthogonal to the first and second input beam paths 710,711.

The first moveable reflector 700 moves a separation distance 705 in a direction that is orthogonal to a reflective surface 701 on the first moveable reflector 700. As described above, moving the first moveable reflector 700 the separation distance 705 in a direction which is orthogonal to the reflective surface 701, provides a separation between the first, second, and third reflected beam paths 715,716,714 which can be 1.4 times greater than the separation distance 705.

A second moveable reflector 750 can be oriented parallel to the first moveable reflector 700 and positioned in a first or a second associated reflecting position 775, 780. The second moveable reflector 750 moves the separation distance 705 in a direction that is orthogonal to a reflective surface 751 on the second moveable reflector 750. When the second moveable reflector 750 is in the first reflecting position 775, optical radiation is reflected from the first, second or third reflected beam paths 715,716,714 to outputs A, B or C along fourth, fifth, and sixth reflected beam paths 717,718,719 respectively. The fourth, fifth and sixth reflective beam paths 717,718,719 are orthogonal to the first and second reflected beam paths 715, 716.

When the second moveable reflector 750 is in the second reflecting position 780, optical radiation is reflected from the first, second, or third reflective beam paths 715,716,714 to outputs B, C or D along the fifth, sixth or a seventh reflected beam path 718,719,720. The seventh reflected beam path 720 is orthogonal to the first, second and third reflected beam paths 715,716,714. As discussed above, the first and second reflecting positions 775, 780 are separated by the separation distance 705 thereby providing a separation of about 1.4 time the separation distance between the fourth through seventh reflective beam paths 717–720.

It will be understood that if the first and second moveable reflectors 700,750 each move an equal separation distance in the same direction, optical radiation can be reflected along coincident reflected beam paths as described above, for example, in reference to FIG. 4.

Figure 9:
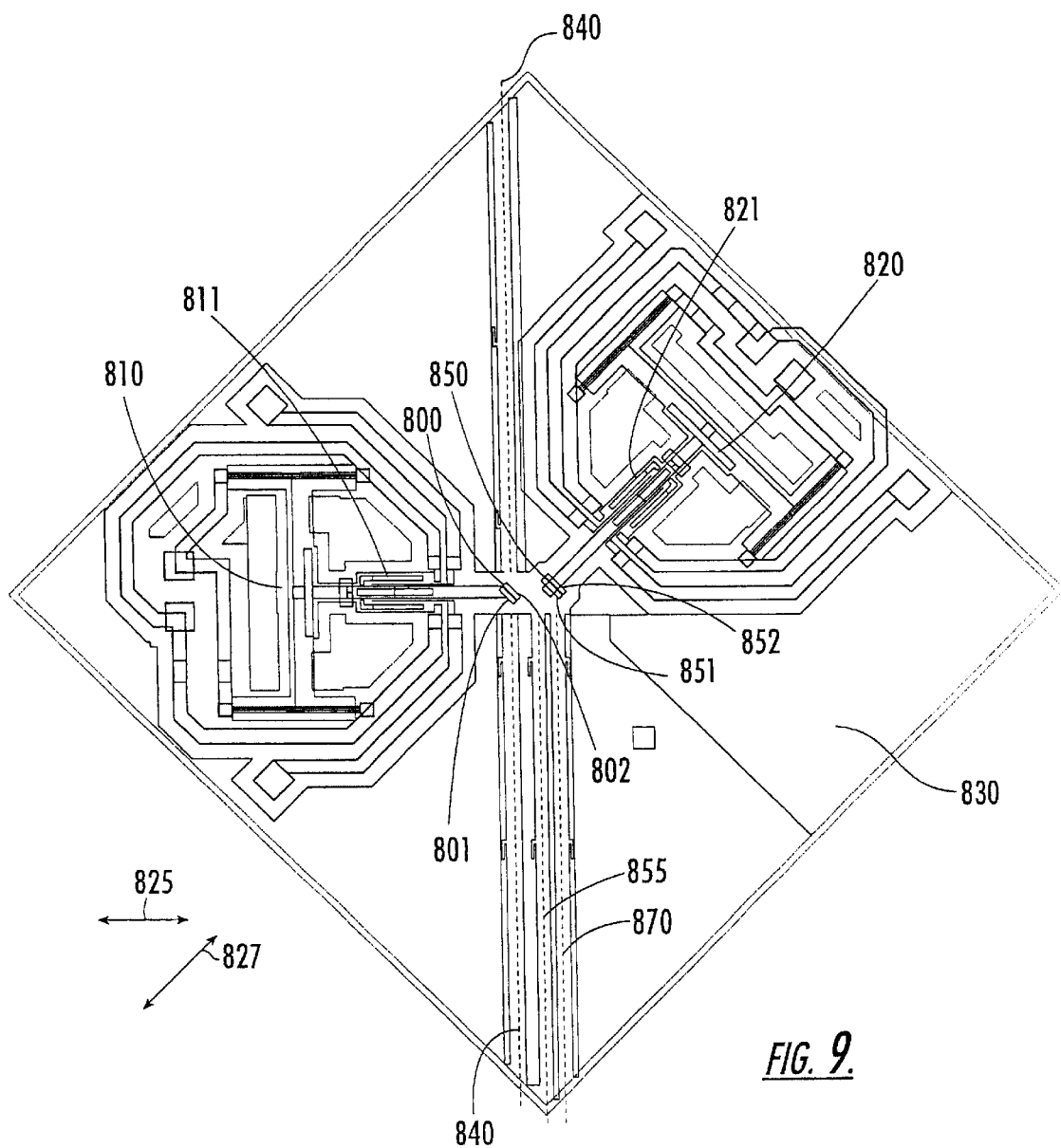
FIG. 9 is a schematic diagram that illustrates embodiments of 1×3 optical switches according to the present invention.

FIG. 9 is a plan view that illustrates embodiments of 1×3 MEMS optical switches including two moveable reflectors 800,850 and their associated actuators 810,820 and latches 811,821 on a common die 830 or substrate according to the present invention. As shown in FIG. 9, the actuator 810 and latch 811 associated with the first moveable reflector 800 are located on the common die 830 adjacent to a first surface 801 of the first moveable reflector 800 opposite an opposing surface 802.

Similarly, the actuator 820 and latch 821 associated with the second moveable reflector 850 are located on the common die 830 adjacent to a first surface 852 of the second moveable reflector 850 opposite an opposing surface 851.

The actuator 810 is coupled to the first moveable reflector 800 by a member that extends therebetween. The latch 811 can engage the member to hold the member in a predetermined position. Accordingly, the first moveable reflector 800 can be held in a position by engaging the latch 811 with the member. Similarly, the actuator 820 is coupled to the second moveable reflector 850 by a member that extends therebetween. The latch 821 can engage the member to hold the member in a predetermined position. Accordingly, the second moveable reflector 850 can be held in a position by engaging the member with the latch 821.

The first actuator 810 can move the first moveable reflector 800 between reflecting and non-reflecting positions in a first direction 825 that is orthogonal to an input beam path 840. The latch 811 can hold the first moveable reflector 800 in the reflecting or non-reflecting position.

The second actuator 820 can move the second moveable reflector 850 between first and second reflecting positions in a second direction 827 that is orthogonal to a reflective surface on the second moveable reflector 850. The latch 821 can hold the second moveable reflector 850 in the reflecting or non-reflecting position. The first and second moveable reflectors 800,850 reflect optical radiation from the input beam path to a first or second output along a first or second reflected beam paths 855,870. Alternatively, when the first moveable reflector 800 is in the non-reflecting position, optical radiation continues along the input beam path 840 to a third output.

It will be understood that the moveable reflectors can move between parallel positions in directions parallel to a substrate on which they are located or can pivot or "pop-up" from the substrate. Other types of movement can be used.

Positioning the actuators and latches adjacent to a first surface of the associated moveable reflector and opposite a second opposing surface of the moveable reflector can allow more than one moveable reflector/actuator/latch combination to be located on a common die. In particular, locating the actuators and latches adjacent to one surface of the moveable reflector enables other moveable reflectors and actuators and latches to be located adjacent a second opposing surface of the moveable reflector.

Moreover, the moveable reflectors can be placed in close proximity to one another so that the optical beam path distance between the moveable reflectors can be reduced, thereby reducing attenuation of optical radiation along the optical beam path. Furthermore, optical radiation may propagate between moveable reflectors in free-space, thereby reducing the need for optical fibers to couple the optical radiation between reflectors on separate dies. In contrast, conventional first and second moveable reflectors/actuator/latch combinations may be located on separate dies so that optical radiation reflected by the first reflector propagates across the a first die to the second moveable reflector on a second die, for example, via an optical fiber.

In some embodiments, optical fibers can be positioned on the common die 830 along the optical paths 840,855,870 proximate to the first and second moveable reflectors 800, 850. Accordingly, the distance which the optical radiation propagates in freespace from the reflector to the optical fiber may be reduced thereby reducing the optical loss associated with the optical radiation. In such embodiments, the need for optical devices located at the boundaries of the common die 830 may be reduced thereby allowing a reduction in the fabrication costs associated with the optical switch.

Figure 10:
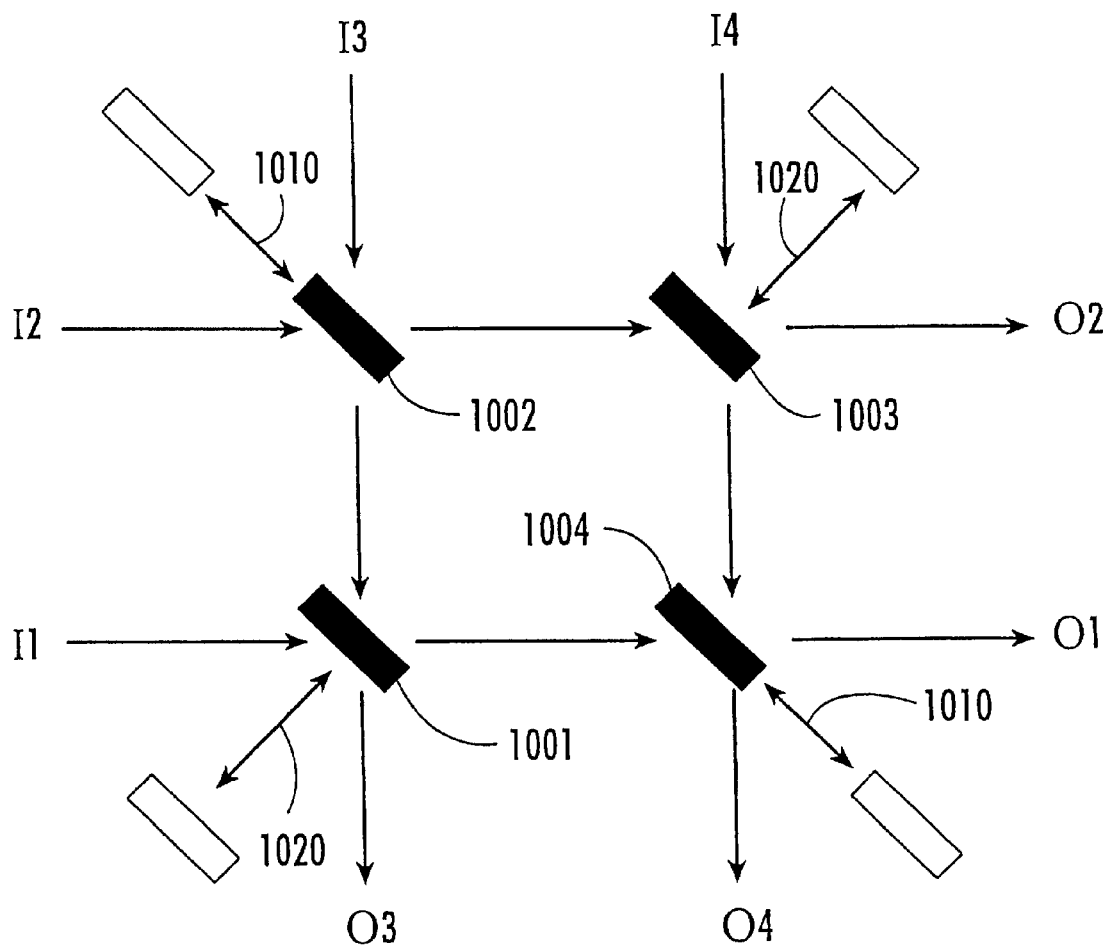
FIG. 10 is a plan view that illustrates embodiments of partially blocking 4×4 optical switches according to the present invention.

FIG. 10 is a plan view that illustrates embodiments of partially blocking 4×4 optical switches according to the present invention. According to FIG. 10, first, second, third, and fourth moveable reflectors 1001–1004 are moveable to reflecting and non-reflecting positions to switch optical radiation from four inputs I1–I4 to four outputs O1–O4. In particular, the first and third moveable reflectors 1001,1003 are moveable to respective reflecting positions along an optical beam path and respective non-reflecting positions outside the optical beam path in a direction 1020 that is orthogonal to a reflective surface of the first and third moveable reflectors 1001,1003.

The second and fourth moveable reflectors 1002,1004 are moveable to respective reflecting positions along an optical beam path and respective non-reflecting positions outside the optical beam path in a direction 1010 that is parallel to reflective surfaces of the second and fourth moveable reflectors 1002,1004. It will be understood that the positions shown in FIG. 10 in which the moveable reflectors are shaded correspond to the reflecting positions. The positions in which the moveable reflectors are not shaded correspond to non-reflecting positions.

In operation, the first through fourth moveable reflectors 1001,1004 are moved to the associated reflecting or non-reflecting position to provide the desired operation. FIG. 11 is a table that illustrates exemplary states of the first-fourth moveable reflectors 1001–1004 to provide optical radiation from the inputs I1–I4 to the outputs O1–O4. FIG. 11 further illustrates that the some of the inputs I1–I4 are not switched to the outputs O1–O4. For example, input I1 is not provided to output O2 and input I4 is not provided to output O3.

Figure 14:
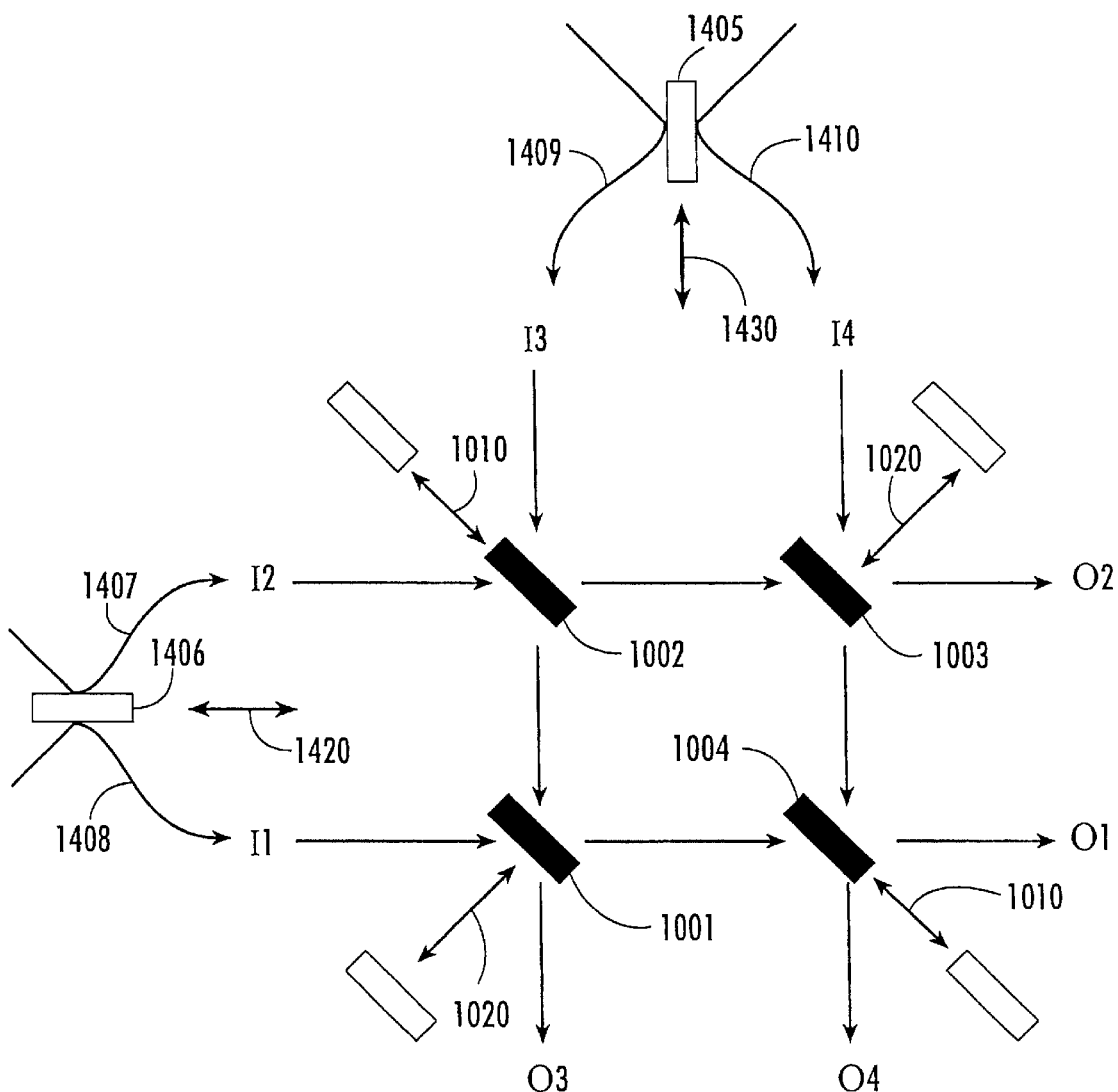
FIG. 14 is a plan view that illustrates embodiments of non-blocking 4×4 optical switches according to the present invention.

FIG. 14 is a plan view that illustrates embodiments of non-blocking 4×4 optical switches according to the present invention. A first off-die double sided reflector 1405 moves in a direction 1430 to either reflect optical radiation or allow the optical radiation to pass through to either input I3 or input I4 via first and second optical fibers 1409,1410. A second off-die double sided reflector 1406 moves in a direction 1420 to either reflect optical radiation or allow the optical radiation to pass through to either input I1 or input I2 via third and fourth optical fibers 1408,1407. Accordingly, inputs which are blocked from outputs in embodiments shown in FIG. 10, can be redirected by the off die double sided reflectors 1405,1406 to provide non-blocking embodiments.

Figure 12:
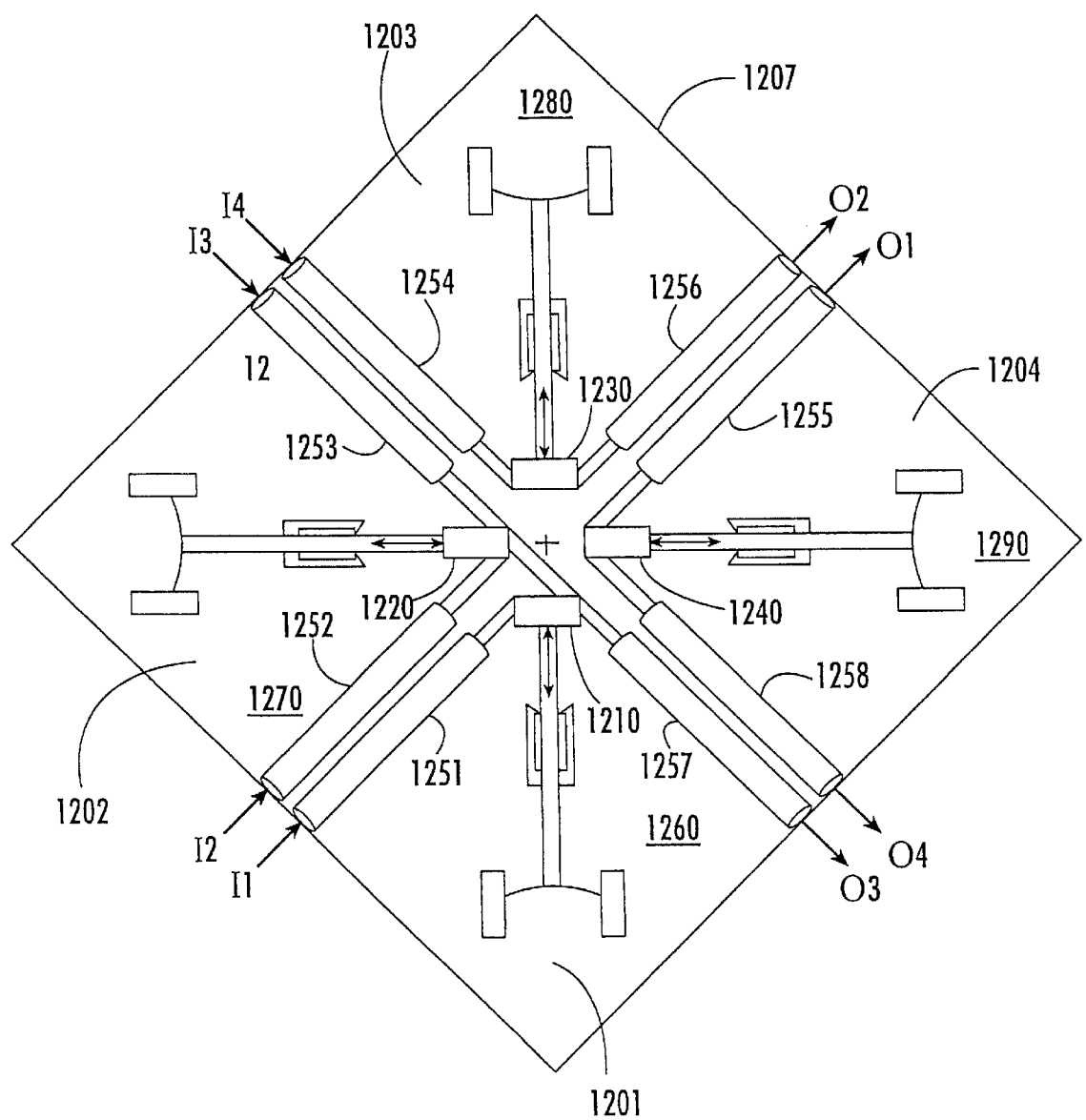
FIG. 12 is a plan view that illustrates embodiments of 4×4 optical switches according to the present invention.

As shown in FIG. 10, each moveable reflector moves in a direction that allows each actuator/latch combination associated therewith to be located in a separate quadrant of the common die as shown, for example, in a plan view of FIG. 12. As shown in FIG. 12, the respective movements of first through fourth moveable reflectors 1210–1240 allow first through fourth actuator/latch combinations 1201–1204 to be located in first through fourth quadrants 1260–1290 respectively on a common die 1207. Arrangements other than quadrants may also be used.

In some embodiments, optical fibers 1251–1258 are positioned on the common die 1207 along inputs I1–I4 and outputs O1–O4 proximate to the first through fourth moveable reflectors 1210–1240. Accordingly, the distance which the optical radiation propagates in freespace from the reflector to the optical fiber may be reduced thereby reducing the optical loss associated with the optical radiation. In such embodiments, the need for optical devices located at the boundaries of the common die 1207 may be reduced thereby allowing a reduction in the fabrication costs associated with the optical switch.

Figure 13:
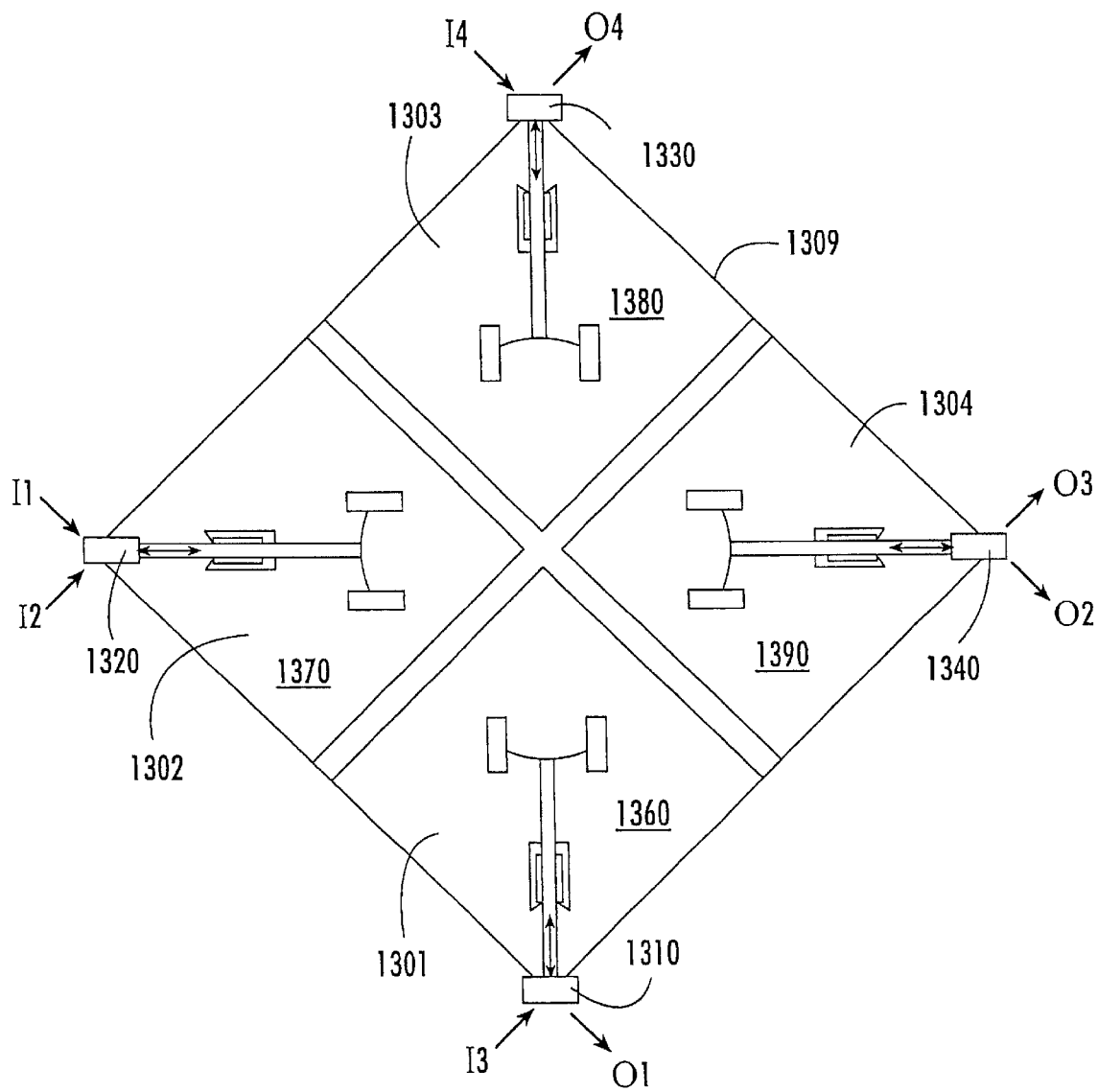
FIG. 13 is a plan view that illustrates embodiments of 4×4 optical switches according to the present invention.

In other embodiments illustrated, for example, in FIG. 13, moveable reflectors 1310–1340 can be located in separate quadrants 1360–1390 on an outer portion of a common die 1309 and actuator/latch combinations 1301–1304 attached thereto can be located on an inner portion of the common die 1309.

It will be understood that other actuator/latch configurations can be used. For example, the latch may be located between the associated moveable reflector and actuator as shown, for example, in FIGS. 12 and 13 or the actuator may be located between the associated moveable reflector and latch. Moreover, other embodiments may use multiple latching schemes and/or multiple actuator schemes.

The above embodiments illustrate how the present invention may be utilized to provide more than one moveable reflector/actuator/latch combination on a common die. Furthermore, as discussed above, the invention can also be used to provide moveable actuators that have more than one reflecting position. However, it will be understood that the invention may be used for purposes that do require the placement of more than one moveable reflector/actuator/latch combination on a common die. Similarly, the invention can be utilized for purposes that do not require moveable reflectors with more than one reflecting position.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed:

1. An optical switch comprising:
   a substrate;
   a moveable reflector, on the substrate, having first and second opposing surfaces and that moves to first and second positions on the substrate;
   a latch, on the substrate adjacent to the first surface of the moveable reflector opposite the second surface and coupled to the moveable reflector that holds the moveable reflector in at least one of the first and second positions; and
   an actuator, on the substrate adjacent to the first surface of the moveable reflector opposite the second surface and coupled to the latch that moves the moveable reflector to the first and second positions, wherein the first and second positions comprise first and second respective parallel reflecting positions.

2. An optical switch according to claim 1, wherein the first position comprises a reflecting position and the second position comprise a non-reflecting position.

3. An optical switch according to claim 1, wherein the moveable reflector moves in a direction that is orthogonal to the first surface.

4. An optical switch according to claim 1, wherein the substrate comprises a die of a wafer, the optical switch further comprising:
   a second moveable reflector, on the die adjacent to the second surface of the first moveable reflector, the second moveable reflector having first and second opposing surfaces and that moves to first and second positions on the die;
   a second latch, on the die adjacent to the first surface of the second moveable reflector opposite the second surface and coupled to the second moveable reflector that holds the second moveable reflector in at least one of the first and second positions; and
   a second actuator, on the die adjacent to the first surface of the second moveable reflector opposite the second surface and coupled to the second latch that moves the second moveable reflector to the first and second positions associated therewith.

5. An optical switch comprising:
   a substrate;
   a moveable reflector, on the substrate, having first and second opposing surfaces and that moves to first and second positions on the substrate;
   a latch, on the substrate adjacent to the first surface of the moveable reflector opposite the second surface and coupled to the moveable reflector that holds the moveable reflector in at least one of the first and second positions; and
   an actuator, on the substrate adjacent to the first surface of the moveable reflector opposite the second surface and coupled to the latch that moves the moveable reflector to the first and second positions, wherein the moveable reflector has a first reflecting position along an input beam path to reflect optical radiation from the input beam path along a first reflected beam path and a second reflecting position along the input beam path spaced-apart from the first reflecting position to reflect optical radiation from the input beam path along a second reflected beam path parallel to the first reflected beam path.

6. An optical switch comprising:
   a moveable reflector having a first reflecting position along an input beam path to reflect optical radiation from the input beam path along a first reflected beam path and a second reflecting position along the input beam path spaced-apart from the first reflecting position to reflect optical radiation from the input beam path along a second reflected beam path parallel to the first reflected beam path, wherein the moveable reflector moves from the first reflecting position to the second reflecting position in a direction that is substantially orthogonal to a reflective surface of the moveable reflector.

7. An optical switch comprising:
   a moveable reflector having a first reflecting position along an input beam path to reflect optical radiation from the input beam path along a first reflected beam path and a second reflecting position along the input beam path spaced-apart from the first reflecting position to reflect optical radiation from the input beam path along a second reflected beam path parallel to the first reflected beam path, wherein the moveable reflector moves from the first reflecting position to the second reflecting position in a direction that is substantially parallel to the first and second reflected beam paths.

8. An optical switch comprising:
a moveable reflector having a first reflecting position along an input beam path to reflect optical radiation from the input beam path along a first reflected beam path and a second reflecting position along the input beam path spaced-apart from the first reflecting position to reflect optical radiation from the input beam path along a second reflected beam path parallel to the first reflected beam path;
a second moveable reflector having first and second associated reflecting positions along the first and second reflected beam paths, wherein the second moveable reflector reflects optical radiation from the first reflected beam path to a third reflected beam path and reflects optical radiation from the second reflected beam path to a fourth reflected beam path when the second moveable reflector is in the first reflecting position associated with the second moveable reflector; and
wherein the second moveable reflector reflects optical radiation from the first reflected beam path to a fifth reflected beam path and reflects optical radiation from the second reflected beam path to a sixth reflected beam path when the second moveable reflector is in the second reflecting position.

9. An optical switch according to claim 8, wherein the first and second moveable reflectors move unequal distances in parallel directions between the respective first and second reflecting positions; and
wherein the fourth and fifth reflected beam are co-incident.

10. An optical switch according to claim 8, wherein the first and second moveable reflectors move unequal distances in parallel directions between the respective first and second reflecting positions; and
wherein the fourth and fifth reflected beam paths are spaced-apart.

11. An optical switch according to claim 8, wherein the first moveable reflector moves a distance in a first direction that is substantially parallel to the first and second reflected beam paths and the second moveable reflector moves the distance in a second direction that is substantially orthogonal to a reflective surface of the second moveable reflector;
wherein the fourth and fifth reflected beam paths are spaced-apart.

12. An optical switch according to claim 8 further comprising:
a first actuator coupled to the first moveable reflector that moves the first moveable reflector between the first and second reflecting positions associated with the first moveable reflector; and
a second actuator coupled to the second moveable reflector that moves the second moveable reflector between the first and second reflecting positions associated with the second moveable reflector.

13. An optical switch according to claim 8 further comprising:
a reflector that reflects optical energy from the third and fourth reflected beam paths.

14. An optical switch according to claim 8, wherein the first moveable reflector moves in a first direction that defines about a 45 degree angle with a reflective surface of the first moveable reflector and wherein the second moveable reflector moves in a second direction that is substantially orthogonal to a reflective surface on the second moveable reflector.

15. An optical switch according to claim 7, wherein a first distance between the first and second reflecting positions is between about 50 um to about 100 um and a second distance between the first and second reflected beam paths is between about 70 um to about 140 um.

16. An optical switch according to claim 8, wherein the first and second moveable reflectors are on a common substrate.

17. An optical switch according to claim 6, wherein the moveable reflector is oriented to define about a 70 degree angle relative to the input beam path.

18. An optical switch according to claim 6, wherein the moveable reflector is oriented to define about a 45 degree angle relative to the input beam path.

19. An optical switch comprising:
a first moveable reflector that moves to first and second associated reflecting positions along an input beam path, wherein the first moveable reflector reflects optical radiation from the input beam path to a first reflected beam path when the first moveable reflector is in the first associated reflecting position and reflects optical radiation from the input beam path to a second reflected beam path when the first moveable reflector is in the second associated reflecting position;
a second moveable reflector that moves to first and second associated reflecting positions along the first and second reflected beam paths, wherein the second moveable reflector reflects optical radiation from the first reflected beam path to a third reflected beam path and reflects optical radiation from the second reflected beam path to a fourth reflected beam path when the second moveable reflector is in the associated first reflecting position; and
wherein the second moveable reflector reflects optical radiation from the first reflected beam path to the fourth reflected beam path and reflects optical radiation from the second reflected beam path to a fifth reflected beam path when the second moveable reflector is in the associated second reflecting position, wherein the first and second moveable reflectors are on a common substrate.

20. An optical switch according to claim 19, wherein the first and second moveable reflectors each move equal distances in parallel directions between the respective first and second reflecting positions; and
wherein the fourth and fifth reflected beam paths are co-incident.

21. An optical switch according to claim 19, wherein the first and second moveable reflectors move unequal distances in parallel directions between the respective first and second reflecting positions; and
wherein the fourth and fifth reflected beam paths are spaced-apart.

22. An optical switch comprising:
a first moveable reflector that moves to first and second associated reflecting positions along an input beam path, wherein the first moveable reflector reflects optical radiation from the input beam path to a first reflected beam path when the first moveable reflector is in the first associated reflecting position and reflects optical radiation from the input beam path to a second reflected beam path when the first moveable reflector is in the second associated reflecting position;
a second moveable reflector that moves to first and second associated reflecting positions along the first and second reflected beam paths, wherein the second moveable reflector reflects optical radiation from the first reflected beam path to a third reflected beam path and reflects optical radiation from the second reflected beam path to a fourth reflected beam path when the second moveable reflector is in the associated first reflecting position; and wherein the second moveable reflector reflects optical radiation from the first reflected beam path to the fourth reflected beam path and reflects optical radiation from the second reflected beam path to a fifth reflected beam path when the second moveable reflector is in the associated second reflecting position, wherein the first moveable reflector moves a distance in a first direction that is parallel to the first and second reflected beam paths and the second moveable reflector moves the distance in a second direction that is orthogonal to a reflective surface of the second moveable reflector; and wherein the fourth and fifth reflected beam paths are spaced-apart.

23. An optical switch comprising first and second moveable reflectors each having associated first and second reflecting positions, wherein optical radiation from a first one of a plurality of inputs is reflected from the first and second moveable reflectors to a first one of a plurality of outputs and optical radiation from a second one of the of the plurality of inputs is reflected from the first and second moveable reflectors to a second one of the plurality of outputs, wherein the first and second moveable reflectors are on a common substrate.

24. An optical switch according to claim 23, wherein the first and second moveable reflectors each move equal distances in parallel directions between the respective first and second reflecting positions.

25. An optical switch according to claim 23, wherein the first and second moveable reflectors move unequal distances in parallel directions between the respective first and second reflecting positions.

26. An optical switch comprising first and second moveable reflectors each having associated first and second reflecting positions, wherein optical radiation from a first one of a plurality of inputs is reflected from the first and second moveable reflectors to a first one of a plurality of outputs and optical radiation from a second one of the of the plurality of inputs is reflected from the first and second moveable reflectors to a second one of the plurality of outputs, wherein the first moveable reflector moves a distance in a first direction that is parallel to the first and second reflected beam paths and the second moveable reflector moves the distance in a second direction that defines about a 45 degree angle with a reflective surface of the second moveable reflector.

27. An optical switch comprising:

a moveable reflector having a reflecting position along an input beam path to reflect optical radiation from a reflective surface thereon and a non-reflecting position outside the input beam path that is parallel to the reflecting position, wherein the moveable reflector moves from the reflecting position to the non-reflecting position in a direction that is orthogonal to the reflective surface.

28. A method of conducting optical radiation from inputs of an optical switch to outputs thereof, the method comprising the steps of:

moving a first moveable reflector to one of a first and second associated reflecting positions along an input beam path to switchably reflect optical radiation from the input beam path to one of a first and second reflected beam paths; and moving a second moveable reflector to one of a first and second associated reflecting positions along the first and second reflected beam paths to reflect switchably optical radiation from the first and second reflected beam paths to one of first and second outputs of the optical switch.

29. A method according to claim 28, wherein the step of moving the first moveable reflector comprises the step of moving the first moveable reflector a distance in a first direction and the step of moving the second moveable reflector comprises the step of moving the second moveable reflector the distance in a second direction that is parallel to the first direction.

30. A method according to claim 28 wherein the step of moving the first moveable reflector comprises the step of moving the first moveable reflector a first distance in a first direction and the step of moving the second moveable reflector comprises the step of moving the second moveable reflector a second distance, that is different than the first distance, in a second direction that is parallel to the first direction.

31. A method of conducting optical radiation from inputs of an optical switch to outputs thereof, the method comprising the steps of:

moving a first moveable reflector to one of a first and second associated reflecting positions along an input beam path to reflect optical radiation from the input beam path to one of a first and second reflected beam paths; and moving a second moveable reflector to one of a first and second associated reflecting positions along the first and second reflected beam paths to reflect optical radiation from one of the first and second reflected beam paths to an output, wherein the step of moving the first moveable reflector comprises the step of moving the first moveable reflector a distance in a first direction that is parallel to a reflective surface of the first moveable reflector and the step of moving the second moveable reflector comprises the step of moving the second moveable reflector the distance in a second direction that defines about a 45 degree angle with a reflective surface of the second moveable reflector.

32. An optical switch according to claim 7 wherein the moveable reflector is oriented to define about a 70 degree angle relative to the input beam path.

33. An optical switch according to claim 7, wherein the moveable reflector is oriented to define about a 45 degree angle relative to the input beam path.

* * * * *